Feb. 20, 1968  J. RAMIS  3,369,756
AEROSOL APPARATUS HAVING A CHAMBER-LIKE DEFLECTOR
Filed Feb. 17, 1966
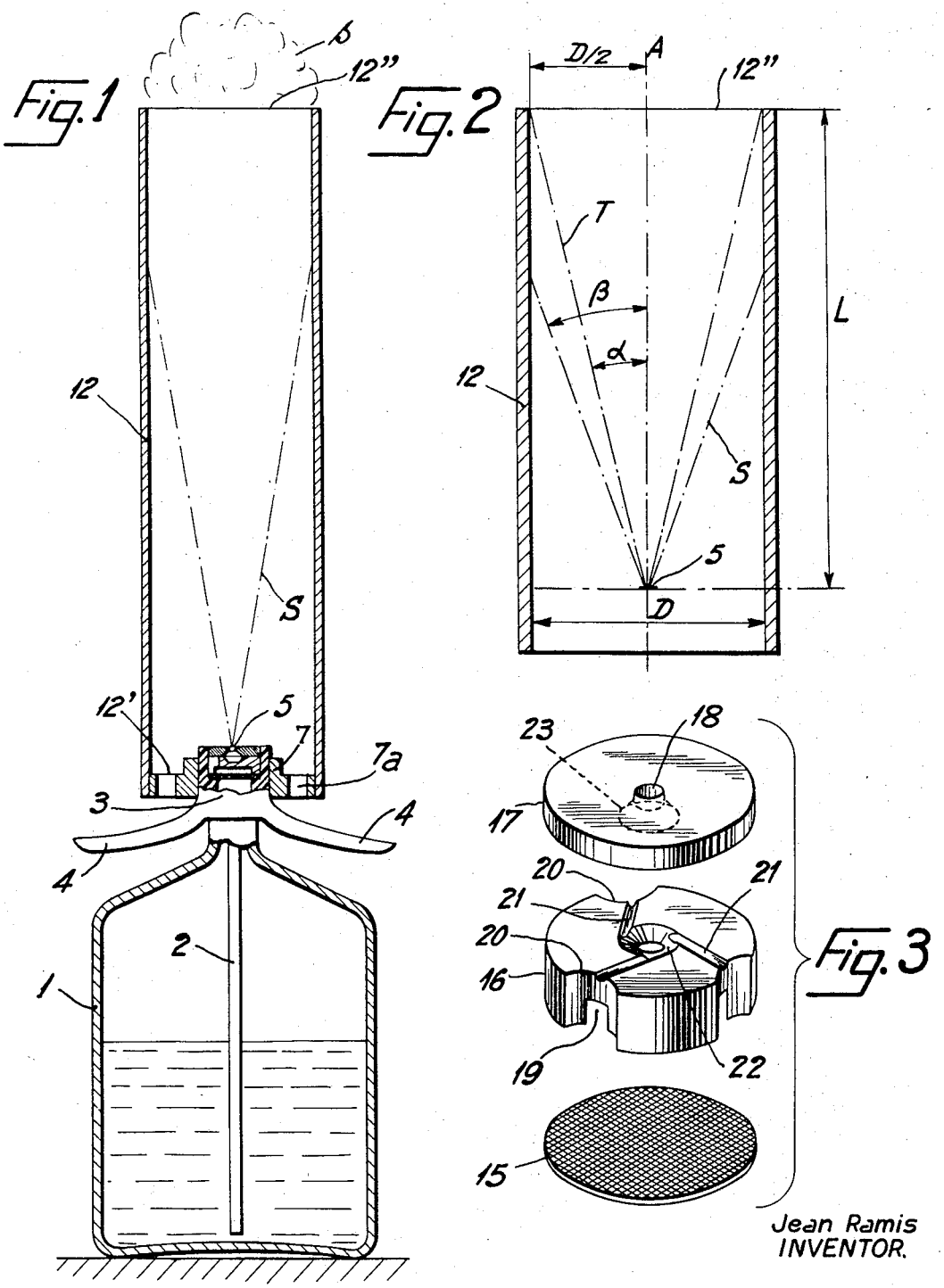
Jean Ramis
INVENTOR.
BY Karl F. Ross
Attorney United States Patent Office 3,369,756
Patented Feb. 20, 1968

3,369,756
AEROSOL APPARATUS HAVING A CHAMBER-LIKE DEFLECTOR
Jean Ramis, 13 Chemin du Bas des Ormes, Marly-le-Roy, Seine-et-Oise, France
Continuation-in-part of application Ser. No. 258,440, Feb. 14, 1963. This application Feb. 17, 1966, Ser. No. 528,284
Claims priority, application France, Feb. 23, 1962, 888,964
2 Claims. (Cl. 239—338)

This application is a continuation-in-part of my copending application Ser. No. 258,440, filed Feb. 14, 1963, now Patent No. 3,236,458.

My present invention relates to a method of and means for producing an aerosol dispersion predominantly composed of particles ranging between 0.5 and 5 microns in diameter.

Devices for the production of aerosols usually comprise a container charged with a propellant volatile liquid and a substance intended to be discharged in an aerosol state, the container being provided with a triggerable discharge valve and nozzle connected to a tube passing down into the vessel to terminate just short of its base. The vapor pressure above the liquid in the container thus forces it towards the valve and jet nozzle so that, upon an unblocking of the outlet, the liquid rises to the level of the valve seat where it is discharged in the form of droplets, the volatile part of which is vaporized in the atmosphere.

In the case where the aerosol is to serve as a vehicle for a therapeutic inhalant, for example, conventional dispensers are not entirely satisfactory since the resultant droplets tend to stray widely beyond the desired range of particle sizes. It has been found, however, that particles above 5 microns in diameter may be unable to reach the air cells of the lungs while particles below 0.5 microns may fail to be deposited therein.

It is an object of the present invention to provide improved means for the production of aerosols, particularly as vehicles for therapeutic substances, as well as a method of dispersion adapted to yield aerosols whose particles are of highly uniform size and substantially entirely within the aforesaid limits.

According to an aspect of my present invention there is provided a device for the production of an aerosol dispersion which comprises an elongated cylindrical tube of substantially constant inside diameter having an unobstructed and fully open discharge end and at least partly open opposite end provided with an orifice leading to a container for a liquid propellant and a substance to be atomized, the container being generally separated from the injection orifice by a normally closed valve. The tube, which may be continuous or composed of telescoped sections as disclosed in my above-identified application, should, in accordance with this invention, have a minimum effective length substantially equal to three times its inside diameter which, in practice, may range between about 1 and 4 cm. with injection orifices whose diameters lie between about 0.1 and 0.3 mm. A practical upper limit of tube length lies in the region of ten inside diameters since beyond that point no substantial improvement in particle-size distribution is observed.

The usual medicinal inhalants are mixed with the volatile propellant in concentrations up to about 14% by weight in case of alcoholic solutions and up to about 7% in case of oily media. Owing to a whirling structure for the jet, the mixture of propellant and medicinal inhalant forms spray cones with apex angles on the order of 30° when discharged at pressures of approximately 4 to 5 atmospheres at room temperatures from an orifice of the dimensions given above; the apex angle changes inversely with pressure, as well as with orifice size, but generally does not decrease below substantially 20° when conventional propellants such as Freon 12 (dichloro-difluoromethane), methyl chloride or butane/propane mixtures are used which develop pressures in a range of about 2½ to 5½ atmospheres. If D is the inside diameter of the tube and L its effective length (as measured from the injection orifice), $D/L=2 \tan \alpha$ where $\alpha$ is the angle of inclination, relative to the tube axis, of the trajectory of the last particle still to be intercepted by the tube wall. If the ratio $L/D$ has a minimum value of 3, as stated above, $\alpha=2 \tan^{-1} 0.167=9\frac{1}{2}°$ which means that some particles will still strike the tube wall even if the apex angle is as low as 20°. With longer tubes and/or larger apex angles, the percentage of intercepted particles rises until it levels off at about ten diameters; it should be understood, however, that the invention is based not only on the direct fragmentation of droplets upon collision with the tube wall but also upon atomization due to impact between ricocheting particles and others traveling in the region of the tube axis. Moreover the stationary mass of air contained in the tube acts as an obstacle against which strike the droplets which thus explode in fine particles. Lastly the volatile portion of the droplets is vaporized within the tube entailing a size reduction of the droplets. In order to promote the collision between droplets and vaporization of the propellant, the effective length L of the tube is preferably made not less than 10 cm. independently of the tube diameter D.

An aerosol dispenser of the type described produces an output which is predominantly composed of droplets with a particle size of 5 microns or less and which may therefore be defined as a "smoke." Best results, in terms of uniformity of dispersion and compactness of structure, are obtain with a ratio $L/D$ ranging between 5 and 7, the magnitude of D being advantaegously between 18 and 30 mm.

The invention will be described in greater detail with reference to the accompanying drawing in which:

FIG. 1 is an axial sectional view of a dispersion device embodying the invention;

FIG. 2 diagrammatically illustrates the parameters involved in the dimensioning of the device FIG. 1; and FIG. 3 is a perspective exploded view of a whirling structure.

In FIG. 1 I have shown a container 1 for a mixture to be dispersed as an aerosol, this mixture including one of the aforementioned conventional propellants and a preferably oily or alcoholic solution to be conveyed thereby; the concentration of solution in the mixture is assumed to lie within the limits given above, i.e. up to 7% by weight in the case of an oil up to 14% in the case of an alcohol.

A discharge tube 2 rises from a point near the bottom of vessel 1 through its top and terminates at a conventional valve 3 which is normally closed and can be opened against the force of an internal spring (not shown) by manual depression of a pair of wings 4 with reference to the container 1. The outlet end of the valve member 3, which comprises a well known whirling structure, has the form of an orifice 5 having a diameter of, say 0.2 mm. Valve member 3 is seated in a collar 7 projecting inwardly from a partly closed end 12' of a tube 12 whose opposite end 12'' is completely open; it will be noted that there are no obstructions within the tube between the outlet 5 and the open end 12''. The inlet end 12' of the tube is shown provided with several air-entrance apertures 7a.

A whirling structure as disclosed in my above-identified application may comprise the stack of three elements shown by the FIG. 3, which stack is tightened in the opening of the valve member 3. This stack comprises a filter 15, a recessed cylinder 16 and a plate 17 formed with the outlet aperture 18. The recessed cylinder has a rear cavity 19 communicating through three wide peripherally distributed slots 20 with the upper surface of the cylinder. Slots 21 are formed on this upper surface and lead tangentially in the same direction to the edge of the central frusto-conical cavity 22 of this upper surface. The cavity 22 cooperates with the rear frusto-conical opening 23 of the aperture 18 (the two bases having the same diameter) to form a small chamber in which the liquid arriving through the filter 15, the acvity 19 and the slots 20 and 21 whirls before leaving in the form of a fast conically diverging jet through the aperture 38.

In operation, a triggering of valve 3 by a depression of wings 4 releases a conical spray S of relatively coarse droplets which, upon striking the inner wall of tube 12 in the region near its open end 12″, are fragmentized and deflected to collide with other droplets so as to give rise to a smoke s′ of substantially uniform particles within a range of 0.5 to 5 microns. For this purpose it is necessary, as shown in FIG. 2, that the effective length L of the tube (as measured from the apex of the spray cone at orifice 5 to the open end 12″) be so related to the inner diameter D that the apex angle $\beta$ of the cone be largely greater than $2\alpha$ where $\alpha$ is the angle of inclination, with reference to the tube axis A, of the trajectory T of the last particle to strike the tube wall at the open end 12″. This condition is generally satisfied, as pointed out above, if $L \geqslant 3D$ and, preferably, if $3D \leqslant L \leqslant 10D$ where D lies between about 1 and 4 cm.

For example, with a mixture of 5% of Indian corn oil in Freon 12 and tubes having the same inner diameter $D=2$ cm. and increasing lengths, the following results were obtained:

| Length of the tube (in cm.) | Diameter of the largest droplets (in microns) | Weight increase of the tube after 20 operations of the metering valve (in mg.) |
| --- | --- | --- |
| 5 | 25 | 22 |
| 7 | 15 | 25 |
| 9 | 13 | 26 |
| 11 | 11 | 29 |
| 13 | 8 | 29 |
| 15 | 7.5 | 29 |
| 17 | 5 | 29 |
| 19 | 5 | 29 |

For a length of 13 cm. (the elected practical length for the tube), the mean diameter of the droplets is about 4.2 microns.

I claim:
1. A dispenser for an aerosol dispersion, comprising an elongated tube having a first end opening directly into the open air and an at least partly open second end communicating with the atmosphere; supply means outside said tube for delivering a mixture of a propellant and a conveyed solution; a nozzle connected to said supply means and extending axially within said tube at a location remote from said first end and close to said second end, said nozzle having a single orifice on the tube axis facing said first end for discharging said mixtrue axially into said tube toward said first end, the inside of said tube beng unobstructed between said orifice and said first end, the effective length of said tube from said orifice to said first end ranging between substantially 3 and 10 times its inner diameter and being at least equal to 10 cm., said inner diameter lying between substantially 1 and 4 cm., said orifice having a diameter between substantially 0.1 and 0.3 mm; and normally closed valve means at said nozzle selectively operable to trigger the discharge of said mixture in the form of a divergent spray cone striking the wall of said tube ahead of said first end, resulting in an aerosol dispension with particle sizes ranging between 0.5 and 5 microns in diameter.

2. A dispenser as defined in claim 1 wherein said nozzle is provided with a whirling structure ahead of said orifice.

References Cited

UNITED STATES PATENTS

| 1,723,955 | 8/1929 | Shepherd et al. | 239—9 |
| 2,869,188 | 1/1959 | Cameto | 239—338 |
| 2,934,421 | 4/1960 | Akesson | 239—8 |
| 3,137,416 | 6/1964 | Shepherd et al. | 222—394 |
| 3,192,611 | 7/1965 | Briechle et al. | 239—573 |
| 1,748,248 | 2/1930 | Shepherd | 239—8 |
| 2,951,644 | 9/1960 | Mahon et al. | 239—338 |
| 3,063,258 | 11/1962 | Szachnitowski | 239—499 |
| 3,097,645 | 7/1963 | Lester | 239—338 |
| 3,236,458 | 2/1966 | Ramis | 239—338 |
| 3,302,834 | 2/1967 | Alsop | 239—338 X |

FOREIGN PATENTS 273,695  7/1951  Switzerland.

M. HENSON WOOD, JR., *Primary Examiner.*

EVERETT W. KIRBY, *Examiner.*

R. S. STROBEL, VAN C. WILKS,
*Assistant Examiners.*